Dec. 20, 1932.  R. ELBE  1,891,873
APPARATUS FOR TREATING FOOD STUFFS SUCH AS MEAT AND FISH
Filed Oct. 23, 1930  3 Sheets-Sheet 1

Inventor
Rudolf Elbe

Dec. 20, 1932. R. ELBE 1,891,873
APPARATUS FOR TREATING FOOD STUFFS SUCH AS MEAT AND FISH
Filed Oct. 23, 1930 3 Sheets-Sheet 2

Inventor
Rudolf Elbe

Patented Dec. 20, 1932

1,891,873

UNITED STATES PATENT OFFICE

RUDOLF ELBE, OF WANDSBEK NEAR HAMBURG, GERMANY

APPARATUS FOR TREATING FOOD STUFFS SUCH AS MEAT AND FISH

Application filed October 23, 1930, Serial No. 490,700, and in Germany June 10, 1930.

This invention relates to apparatus for curing or conditioning meat and sausages, or fish in the production of smoked herrings and the like, for the purpose of rendering them palatable. More particularly the invention relates to that class of apparatus for the purpose mentioned which comprises chambers arranged in juxtaposition and provided with conveyors for carrying the food stuffs to be treated through the different chambers in succession.

Special objects of the invention are to render more efficient and serviceable in operation apparatus of the kind referred to.

With these ends in view the invention consists in the novel combination, arrangement and adaptation of parts, all as more fully hereinafter described, shown in the accompanying drawings and specifically set out in the appended claims.

In the drawings which, as an example, illustrate two constructional forms of the invention:—

Fig. 5 is a vertical longitudinal section of the apparatus adapted for use in treating fish in the production of smoked herrings and the like;

Figs. 7, 8, 9 show constructional details of the apparatus for treating fish in the production of herrings and the like.

Figures 1, 2, 3, 4:
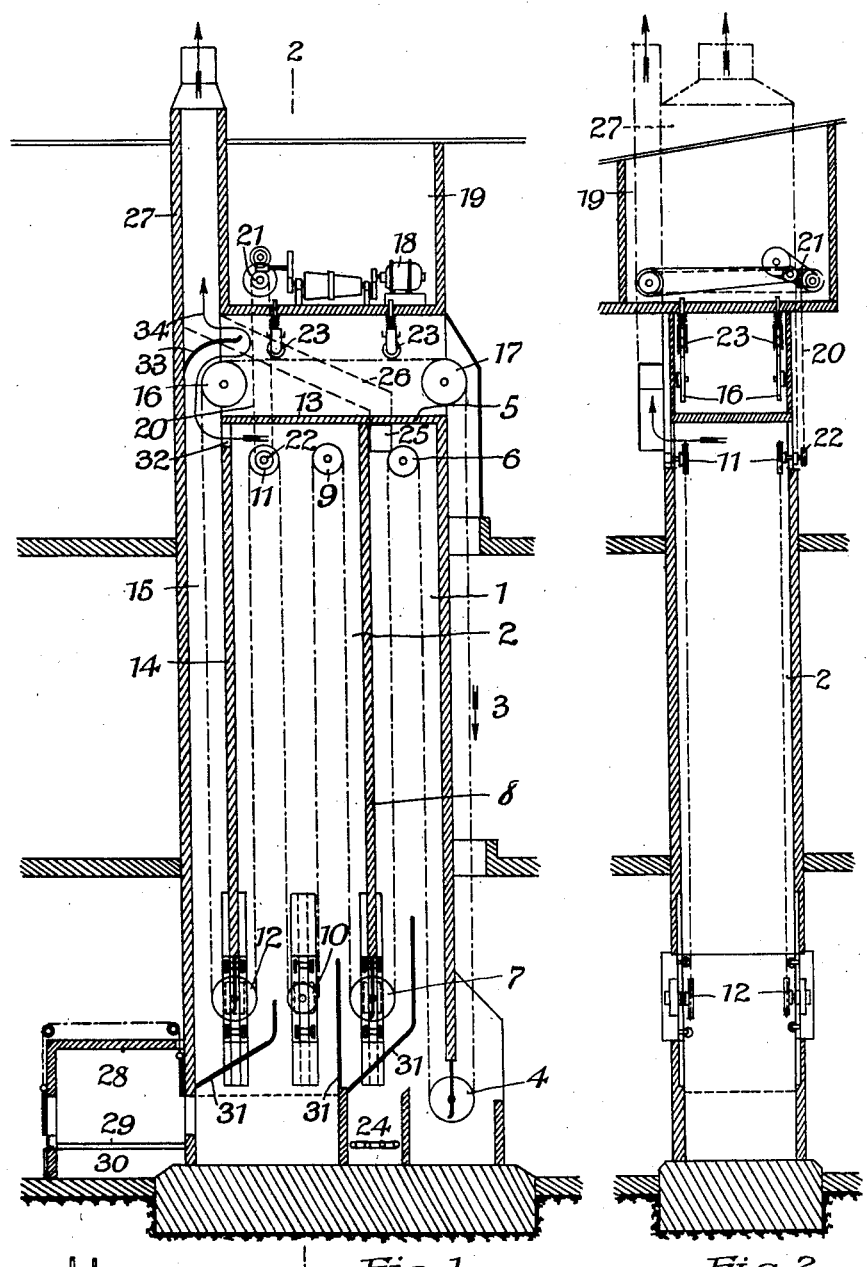
Fig. 1 is a vertical section of the improved apparatus, suitable for treating meat and sausages.
Fig. 2 is a vertical section taken on the line 2—2 of Fig. 1.
Figs. 3 and 4 show constructional details of the apparatus according to Figs. 1 and 2.

The improved apparatus comprised in the construction shows in Figs. 1 and 2 two upright and adjacently located chambers 1, 2 which are in the form of a tower extending past several floors of a building. The chamber 1 is dry-heated and is therefore used for drying the food to be smoked; the chamber 2 is the smoke chamber. Both chambers 1 and 2, are traversed throughout their height by a continuous conveyor. This conveyor consists of two endless chains spaced apart and guided over conveniently positioned sprockets, said chains being adapted to receive the food to be dried and smoked in the manner hereinafter described.

In order to explain the path travelled by the chains forming the continuous conveyor, the point of departure selected will be the place marked by the arrow 3 in Figure 1. The chains travel in the direction of the arrow 3 downwardly close to the external wall of the chamber 1, gaps or passages through the respective floors being provided to permit the chains with the food attached, to pass. On the lowest floor, which is preferably used for loading the continuous conveyor, the chains pass into the chamber 1, around sprocket wheels 4 located beneath the external wall of the said chamber 1. Beneath the roof 5 of the chamber 1 are positioned sprocket wheels 6 which guide the chains, so that their downward flights reach the sprocket wheels 7, which are located in a lower opening of the partition 8 separating the chambers 1 and 2. After passing around the sprocket wheels 7, the chains begin their ascent into the smoke chamber 2 in which they are conveyed twice up and down, passing sprocket wheels 9, 10, 11 and 12 in succession, the sprocket wheels 9 and 11 being arranged beneath the roof 13 and the sprocket wheels 10 and 12 at the lower extremity of the chamber 2. The sprocket wheels 12 are located in a lower opening of the external wall 14 of the smoke chamber 2, so that the chains after travelling around these sprockets 12 will rise in an exhaust flue 15 located outside the said external wall 14, and thence pass above the roofs 13, 5 of the two chambers 2, 1, over sprockets 16, 17, to the external wall of the chamber 1.

The drive of the continuous conveyor is effected from a convenient source of power with the assistance of any preferred transmission gearing. In the constructional example given in the drawings, an electric motor 18 is used as the source of power which, with the transmission gear is installed in a chamber 19 above the sprockets 16, 17. The transmission gearing can be altered by any preferred means in order to allow the speed at which the conveyor traverses the two chambers 1, 2 to be regulated according to requirements. According to Figures 1 and 2 the drive of the conveyor is effected by means of a chain gear comprising two sprockets 21, 22 connected by an endless chain 20, the chain wheel 21 being driven by the motor 18 whilst the chain wheel 22 is secured to the shaft carrying the conveyor-chain sprockets 11.

Chain tensioning means are provided for the conveyor to prevent undesirable slackness or vibration, consisting of spring-loaded idlers 23, located above the sprockets 16, 17 acting upon the chain flights between those sprockets. Moreover, the sprockets 7, 10 and 12 at the lower extremities of the chambers 1 and 2 are movable vertically and are weighted in a convenient manner so as to exert a tightening pull on the chains.

The required drying heat supplied to the chamber 1 is produced by a gas fire 24 located in the floor of the chamber 1, or by a separate furnace connected with that chamber, the temperature of which can be regulated by the use of any preferred type of combustible materials. The dry gases ascending the chamber 1 eventually reach the flue 25 beneath the roof 5, and pass into the chimney 27 through the flue 26.

The supply of smoke for the chamber 2 is produced on the floor of the chamber by utilizing suitable combustible material, or in a specially built furnace 28 fitted with regulating dampers and a temperature indicator. The furnace 28 is provided with a grating 29 and an ash pan 30 located beneath it. Baffles 31 are provided in the chamber 1 to ensure that the drying gases and smoke follow their prescribed course along the flights of the conveyor chain. The gases at the upper end of the smoke chamber 2 pass through an opening 32 into the flue 15 and are guided by a baffle 33 in the curvilinear path indicated by the arrow 34 in Fig. 1. This curvilinear path ensures that the food is subjected to the action of the smoke right up to the time it passes the sprockets 16.

As previously mentioned, it is preferable to load the conveyor with the food to be smoked, on the lowest floor of the building containing the dry-heating and smoke plant. The loading is effected in the usual manner by the employment of spits or bars detachably interconnecting the spaced chains of the endless conveyor, the spits or bars serving for suspending the food to be treated in the chambers 1 and 2. The spits or bars are detachably secured to hanging brackets 35, shown in Figures 3 and 4, arranged at convenient intervals on the conveyor chains, the said hanging brackets being pivotally mounted on the link studs of the chain members, so that the goods will be correctly positioned by the action of gravity throughout the travel of the chains.

The completely smoked goods are preferably removed from the conveyor on the first floor.

The operator in charge of the plant is enabled to follow the process through closed windows, so that the temperature of the drying chamber 1 and the smoke production for the chamber 2 may be regulated according to requirements.

Figure 5:
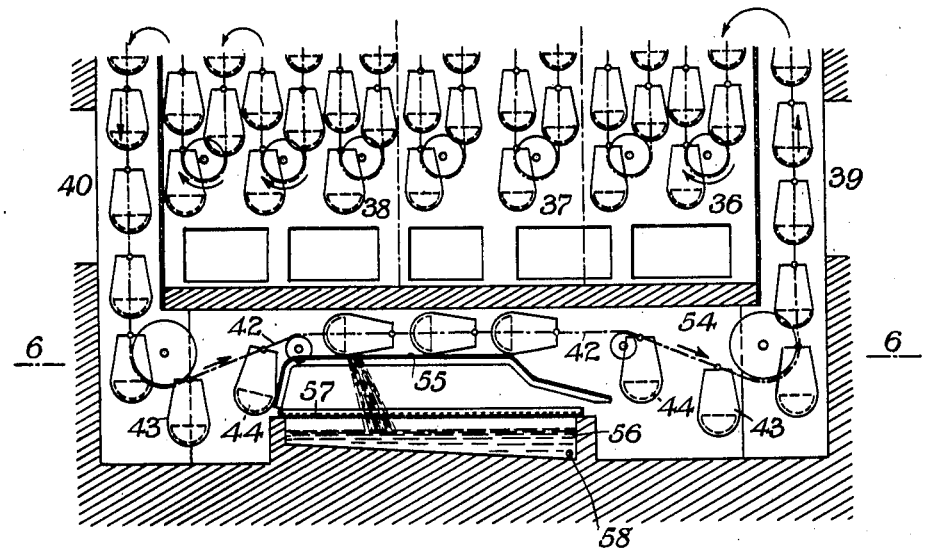
Figure 6:
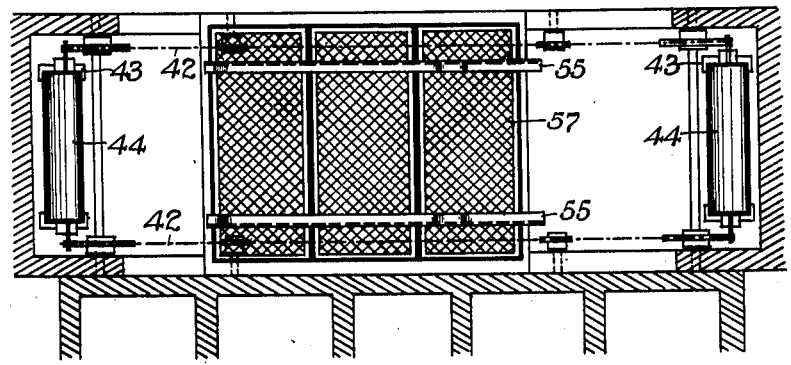
Fig. 6 is a horizontal section taken on the line 6—6 of Fig. 5.

As stated in the preamble to the specification the continuously operating plant can also be employed for treating fish in the production of smoked herrings or the like, but in this case the endless conveyor is arranged for traversing three adjacent chambers, as indicated in Fig. 5, which shows a chamber 36 to be used as a drying chamber, a second chamber 37 adjacent the chamber 36 serving as a curing chamber and a third chamber 38 serving as a smoke chamber. This arrangement may however be varied by using the chamber 37 as a smoke chamber and the chamber 38 as a curing chamber. In either case the curing chamber is to be provided with a furnace supplying heat sufficient for curing the fish.

All three chambers 36, 37, 38 are traversed to their full height by the endless chain conveyor, which is charged through the opening 39 and emptied through the opening 40 indicated in Fig. 5.

The fish are suspended from spits or bars 41 detachably interconnecting the spaced chains 42 of the endless conveyor, the spits or bars being arranged at convenient intervals on the conveyor chains.

Figure 7:
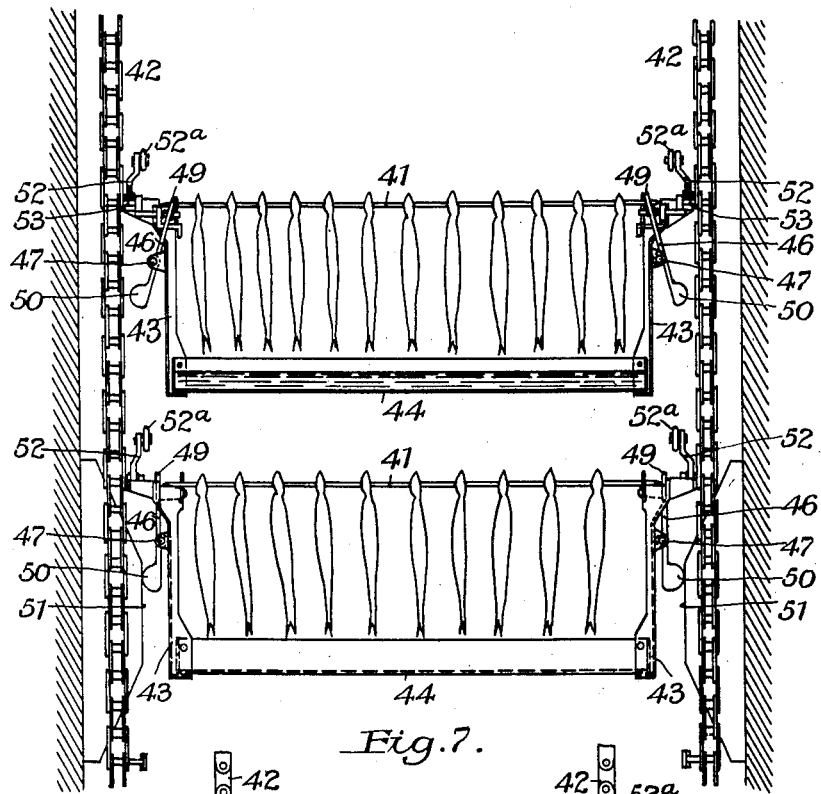

Brackets 43 are oscillatively suspended from the spaced conveyor chains 42 at convenient intervals for detachably supporting the spits or bars 41. Each pair of brackets 43 extend from their points of support down a distance sufficient to carry at their lower ends a trough 44 beneath and separate from the fish hanging on the spits or bars 41 as shown in Fig. 7.

The troughs 44, which horizontally interconnect each pair of suspended brackets 43 at their lower ends, serve for catching the liquid fat dripping from the fish due to the influence of the heat developed in the curing and smoking chambers.

Figure 8:
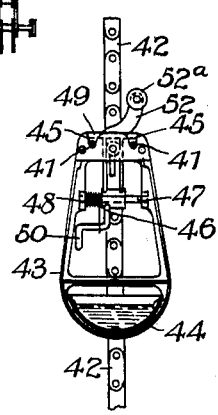
Figure 9:
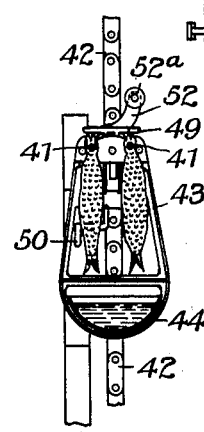

The suspended brackets 43 are provided at their top end with sockets 45 for supporting the spits or bars 41 with the fish suspended therefrom. According to Fig. 8 two such sockets 45 are provided at the top end of the suspended brackets 43, these two sockets being arranged at a distance apart which allows the fish suspended from the spits or bars 41 in said sockets to hang free from contact which each other, as shown in Fig. 9. It is obvious that the number of sockets 45 at the top end of each pair of suspended brackets 43 may be increased, provided that the sockets are arranged at distances apart which permit the fish to hang separate from each other.

To secure the spits or bars 41 against dislocation from their sockets 45 during the travel of the endless conveyor chains, which unavoidably produces vibrations, each suspended bracket 43 is provided with a lock, which comprises essentially a two armed lever 46 fulcrumed at 47 on the bracket and subjected to the action of a spring 48 which presses the top end of the lever in the direction of the suspended spits or bars 41 towards the ends of the latter. The lever 46 is provided at the top end with a cross head 49, which is adapted to fit over the free ends of the spits or bars 41 when they are supported in the sockets 45, as shown in Fig. 7 in connection with the top pair of suspended brackets 43.

In order to automatically liberate the spits or bars 41 when they pass the openings 39 and 40 for loading and unloading the endless conveyor, the lower arms 50 of the two armed levers 46 come to bear against cams 51 arranged stationary in the apparatus. In mounting the cams 51 the lever arms 50 are acted upon so as to turn the levers 46 sufficiently for disengaging their cross heads 49 from the spits or bars 41 resting in their sockets 45, as shown by the lower pair of brackets in Fig. 7.

The troughs 44 which catch the fat dripping from the fish suspended above them, are automatically emptied during the travel of the endless conveyor when same has passed the opening 40 for removing the fish. To effect this automatic emptying of the troughs 44, the brackets 43 are provided with arms 52 projecting above the trunnions 53 which effect the oscillatory suspension of the brackets. Said arms 52 carry antifriction rollers 52ᵃ and act as levers for rocking the brackets 43. This rocking of the brackets 43 tilts the troughs 44, so that their contents run out. The rocking of the brackets 43 for tilting the troughs 44 takes place when the endless conveyor passes in its travel from the point of unloading 40 to the point of loading 39. According to Fig. 5 a passage 54 for the endless conveyor is provided beneath the chambers 36, 37, 38. In this passage 54 are provided cams 55 above a collector 56, the cams 55 projecting into the path of the antifriction rollers 52ᵃ on the arms 52. In mounting the cams 55 the arms 52 and with them the brackets 53 are turned so as to tilt the troughs 44 as shown in Fig. 5. After passing the cams 55, the brackets 43 with their troughs 44 return by gravity to their suspended position.

The collector 56 for receiving the liquid fat from the tilted troughs 44 carries a perforated lid 57 preferably made of a stretched sieve having meshes which allow the liquid fat to pass, but which prevent solid particles of the fish, that have separated therefrom, to reach the collector 56. A conduit 58, which may be provided with a stop cock, serves for draining the collector 56 from time to time when required. Likewise, the lid 57 may be cleaned from the solid particles of the fish collected thereon from time to time when required.

The apparatus when fitted up for use in the production of smoked herrings or the like may be provided with a cooling chamber containing an endless conveyor similar to the conveyor in the chambers 36, 37, 38. The conveyor in this cooling chamber can be charged manually or mechanically with the goods after they have been treated in the chambers 36, 37, 38, communication being effected by way of the opening 40. The unloading of the conveyor in the cooling chamber can take place in any appropriate manner.

I wish it to be distinctly understood, that I do not limit myself to the precise constructions shown, variations in the arrangement and combination of the several parts being possible according to desire or requirement without departing from the scope and spirit of the invention.

What I do claim as my invention and desire to secure by Letters Patent is:

1. An apparatus for curing and conditioning meat, fish, and other food products, comprising a plurality of chambers arranged in juxtaposition and communicating with one another from under the lower edges of the intervening walls, endless conveying chains operative to move the materials through the different chambers in succession, and baffles arranged at the bottom of the chambers for directing the gases into their proper channels.

2. An apparatus as claimed in claim 1 wherein the conveying means are adapted to return the materials to the charging point across the top of the chambers.

3. An apparatus as claimed in claim 1 wherein the conveying means comprises spaced, endless chains, brackets suspended from said chains, transverse suspension bars for the materials engaging in sockets in said brackets, locking means in the brackets for said bars, and means for automatically operating said locking means to release the bars on the materials arriving at the discharging point.

4. An apparatus as claimed in claim 1 wherein the conveying means comprises spaced, endless chains, brackets suspended from said chains, transverse suspension bars for the materials engaging in sockets in said brackets, troughs suspended from the bars to receive drippings from the materials, and means for automatically tripping and emptying the troughs.

5. An apparatus as claimed in claim 1 wherein the conveying means comprises spaced, endless chains, brackets suspended from said chains, transverse suspension bars for the articles engaging in sockets in said brackets, troughs suspended from the bars to receive drippings from the materials, a receptacle arranged in position to be traversed by the troughs, and means for tripping the troughs as they pass said receptacle.

6. An apparatus as claimed in claim 1 wherein the conveying means comprises spaced, endless chains, brackets suspended from said chains, transverse suspension bars for the articles engaging in sockets in said brackets, troughs suspended from the bars to receive the drippings from the materials, a receptacle arranged in position to be traversed by the troughs, a netting covering said receptacle, and means for tripping the troughs as they pass said receptacle.

In witness whereof I have hereunto signed my name this 24th day of September, 1930.

RUDOLF ELBE.